G. W. PETERSON.
VETERINARY IMPLEMENT.
APPLICATION FILED MAY 27, 1913.
1,092,593.
Patented Apr. 7, 1914.
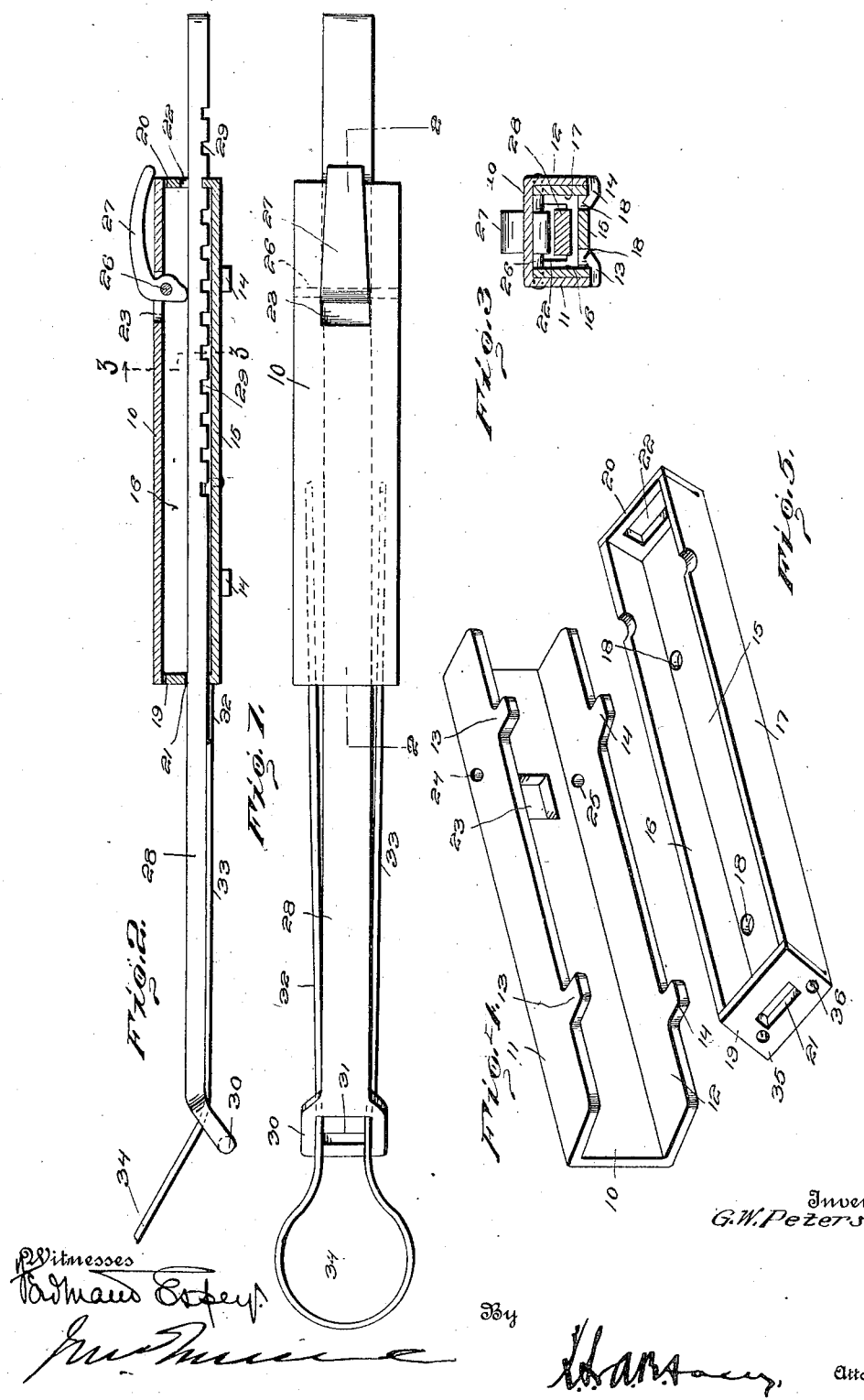
Inventor
G. W. Peterson.

UNITED STATES PATENT OFFICE.

GODFREY W. PETERSON, OF GENOA, NEBRASKA.

VETERINARY IMPLEMENT.

1,092,593.  Specification of Letters Patent.  Patented Apr. 7, 1914.

Application filed May 27, 1913. Serial No. 770,237.

*To all whom it may concern:*

Be it known that I, GODFREY W. PETERSON, citizen of the United States, residing at Genoa, in the county of Nance and State of Nebraska, have invented certain new and useful Improvements in Veterinary Implements, of which the following is a specification.

This invention relates to improvements in veterinary implements and particularly to implements employed for assisting animals in giving birth to their young, and has for one of its objects to simplify and improve the construction and increase the efficiency and utility of devices of this character.

Another object of the invention is to provide a simply constructed implement which may be enlarged or reduced in size and locked in its adjusted position.

With these and other objects in view the invention consists in certain novel features of construction as hereafter shown and described and then specifically pointed out in the claims, and in the drawings illustrative of the preferred embodiment of the invention: Figure 1 is a plan view of the improved implement; Fig. 2 is a longitudinal section on the line 2—2 of Fig. 1; Fig. 3 is a transverse section on the line 3—3 of Fig. 2; Figs. 4 and 5 are perspective views of the casing members.

Corresponding and like parts are referred to in the accompanying description and indicated in all the views of the drawings by the same reference characters.

The improved device comprises a two-part casing which contains the actuating mechanism and at the same time constitutes the hand grip or handle of the improved device. The combined casing and handle comprises an outer casing including a body portion 10 and sides 11—12, the side 11 being provided with projecting lips 13, while the side 12 is provided with similar projecting lips 14. The other casing member includes a body portion 15 and sides 16—17 extending at right angles to the body and spaced apart a distance equal to the space between the sides 11—12 and fitting therebetween. The body 15 is provided with openings 18 which are located opposite the lips 13—14 of the sides 11—12, and when the casing members are disposed one within the other the lips 13—14 are bent over and compressed into the openings 18 as represented in Fig. 3, whereby the two casing members are firmly united. The inner casing member is formed with closed ends 19—20. The outer casing is formed from a single strip of sheet metal while the inner casing is likewise formed from a single strip of sheet metal with the corners cut out to enable the material between the cut-out portions to be bent up against the ends of the sides 16—17 to form the ends, as represented in Fig. 5. The end 19 of the inner casing is provided with an opening 21, while the end 20 is provided with an opening 22 which is somewhat wider than the opening 21. The body portion of the outer casing is provided with a relatively large opening 23 and the sides 11—12 are provided with openings 24—25 adjacent to the larger opening, the smaller opening being designed to receive a transverse pin 26 upon which a cam lever 27 is mounted to swing, the object of the latter being hereafter explained. Slidably disposed through the openings 21—22 is a relatively long bar 28 having a plurality of transverse notches 29 in one side and spaced apart. The notches are designed to engage over one edge of the opening 22 and to be held locked in the notch by the pressure of the cam lever 27, as illustrated in Fig. 2. By this arrangement it will be obvious that when the cam lever is reversed or thrown into inoperative position, the bar 28 may be moved to release the notch 29 from engagement with the edge of the opening 22 and enable the bar to be moved longitudinally of the casing and located with any one of the notches 29 in engagement with the edge of the opening, and then by returning the cam lever to its operative position the bar will be locked in position relative to the casing. By this means the bar may be adjusted to any desired extent within the range of the notches and firmly locked in the adjusted position.

At its outer end the bar 28 is enlarged laterally and directed obliquely to the longitudinal plane of the bar as represented at 30, and the obliquely directed portion provided with a relatively large aperture 31. A wire member forms a part of the improved device and is bent into U shape to form spaced sides 32—33 which extend through the opening 31, and enlarged into a loop 34 at the bend. The sides 32—33 also extend through apertures 35—36 in the end 19 of the inner casing with their inner ends bent laterally and extended through apertures in the body portion 15, and riveted, soldered, or otherwise secured. By this simple means it will be obvious that when the bar 28 is adjusted longitudinally through the casing as above described the oblique portion 30 will be correspondingly moved longitudinally of the sides 32—33 of the wire member, and thus increase or decrease the length of the loop 34, and the loop thus maintained in any desired size.

The loop of the wire member can be readily increased or decreased in size to conform to the portion of the animal with which it is engaged, and firmly and quickly locked in the adjusted position.

The improved device is simple in construction, can be inexpensively manufactured, and the parts can be readily assembled or disconnected for repairs or for restoring a broken or impaired portion.

Having thus described the invention, what is claimed as new is:

1. An implement of the class described comprising a casing having openings of unequal size in its ends, a bar movable through the casing openings and likewise movable laterally in the larger opening, said bar having an aperture at one end, a member connected to the casing and extending through the bar aperture and including a holding loop, and means for clamping said bar against one wall of the larger casing opening.

2. An implement of the class described comprising a bar having a plurality of transverse notches, a casing having openings through which said bar slidably engages, a member connected to the casing and movably engaging the bar and including a holding loop and spaced sides, said sides being secured at their free ends in said casing, and means for moving said bar laterally within said casing to cause one of said notches to engage with one wall of one of said casing openings.

3. An implement of the class described comprising a bar having an aperture at the outer end and provided with a plurality of transverse notches, a casing having openings through which the bar slidably engages, a wire member including a holding loop and extending through the aperture of the bar and secured at one end in said casing, and a cam lever pivoted within said casing and operating to move said bar laterally to cause one of the notches thereof to engage one wall of one of the casing openings.

4. An implement of the class described comprising an inner casing member open at one side and having an opening in each end, an outer casing member open at one side and at the ends and bearing over the inner casing member and closing its open side, means for securing the casing members together, a bar slidable through the end openings of said inner casing and having an opening at one end and with notches spaced apart, said notches adapted to engage one at a time with one wall of one of the end openings of the inner casing member, a wire member including a holding loop and extending through the opening of the bar and secured at one end in said casing, and means carried by the outer casing member for moving said bar laterally to cause the notches to engage the inner casing.

5. An implement of the class described comprising an inner casing member open at one side and having an opening in each end, an outer casing member open at one side and at the ends and bearing over the inner casing member and closing its open side, means for securing the casing members together, a bar slidable through the end openings of said inner casing member, a member including a holding loop and movably supported relative to said bar and secured at one end in said casing, and means for clamping said bar to said casing.

6. An implement of the class described comprising an inner casing member open at one side and having an opening in each end, an outer casing member open at one side and at the ends and bearing over the inner casing member and closing its open side, said inner casing member having sockets and said outer casing member having projecting lugs and engaging in said sockets to secure the casing members together, a bar slidable through said inner casing, a member including a holding loop and movably supported relative to said bar and secured at one end in said casing, and means for clamping said bar to said casing.

In testimony whereof I affix my signature in presence of two witnesses.

GODFREY W. PETERSON. [L. S.]

Witnesses:
WILLIAM S. CROUCH,
ROBERT J. HARRIS.

---

Copies of this patent may be obtained for five cents each, by addressing the "Commissioner of Patents, Washington, D. C."